United States Patent [19]

Ichikawa

[11] Patent Number: 5,450,534
[45] Date of Patent: Sep. 12, 1995

[54] METHOD OF FINDING AND PAINTING A REGION OF A GRAPHICS FIGURE

[75] Inventor: Akira Ichikawa, Saitama, Japan

[73] Assignee: Fuji Xerox Co., Ltd., Tokyo, Japan

[21] Appl. No.: 357,988

[22] Filed: Dec. 16, 1994

Related U.S. Application Data

[63] Continuation of Ser. No. 740,140, Aug. 5, 1991, abandoned.

[30] Foreign Application Priority Data

Aug. 6, 1990 [JP] Japan ................................. 2-206869

[51] Int. Cl.$^6$ .............................................. G06T 11/00
[52] U.S. Cl. ..................................... 395/133; 395/129; 395/143
[58] Field of Search ....................... 395/126, 127–132, 395/133, 141, 142, 143

[56] References Cited

U.S. PATENT DOCUMENTS 5,016,001  5/1991  Minagawa et al. ............... 395/142 X

FOREIGN PATENT DOCUMENTS 62-192878  8/1987  Japan ............................ G06F 15/72

Primary Examiner—Almis R. Jankus
Attorney, Agent, or Firm—Finnegan, Henderson, Farabow, Garrett & Dunner

[57] ABSTRACT

In a method of painting a graphic in accordance with an even-odd rule, a painting region is judged by calculating data such as an intersection point count, a direction value, and a horizontal flag of respective intersection points; calculating a sum of direction values and a sum of horizontal flags of each intersection point based on the above data; calculating a post-operation intersection point count based on the intersection point count, the sum of direction values, and the sum of horizontal flags; and sequentially adding the post-operation intersection point counts from the scanning start point, so that the added value, either an even number or an odd number, serves as a basis for the judgment. Since the inside region or outside region of a graphic can be judged by referencing the sum of direction values and the sum of horizontal flags, even graphic figures having overlapping horizontal paths can be painted correctly.

9 Claims, 7 Drawing Sheets

FIG. 4

| SCANNING LINE | I | II | | | | | III | | | IV | |
|---|---|---|---|---|---|---|---|---|---|---|---|
| INTERSECTION POINT | $S_{11}$ | $S_{21}$ | $S_{22}$ | $S_{23}$ | $S_{24}$ | $S_{25}$ | $S_{31}$ | $S_{32}$ | $S_{33}$ | $S_{41}$ | $S_{42}$ |
| ① X-COORDINATE | 4 | 1 | 4 | 5 | 7 | 11 | 0 | 5 | 7 | 5 | 7 |
| ② INTERSECTION POINT COUNT | 2 | 1 | 2 | 2 | 2 | 2 | 2 | 1 | 1 | 1 | 1 |
| ③ DIRECTION VALUE | 0 | -2 | 1 | 1 | -1 | 1 | 0 | 2 | -2 | 2 | -2 |
| ④ HORIZONTAL FLAG | 0 | 0 | 1 | 2 | -1 | -2 | 0 | 0 | 0 | 0 | 0 |

| | | | | | | | | | | | |
|---|---|---|---|---|---|---|---|---|---|---|---|
| ⑤ SUM OF DIRECTION VALUES | 0 | -2 | -1 | 0 | -1 | 0 | 0 | 2 | 0 | 2 | 0 |
| ⑥ SUM OF HORIZONTAL FLAGS | 0 | 0 | 1 | 3 | 2 | 0 | 0 | 0 | 0 | 0 | 0 |
| ⑦ POST-OPERATION INTERSECTION POINT COUNT | 2 | 1 | 2 | 2 | 2 | 1 | 2 | 1 | 1 | 1 | 1 |

FIG. 8(a)

|   | VERTEX COORDINATES |
|---|---|
| 1 | T1 (4, 7) |
| 2 | T2 (0, 3) |
| 3 | T3 (4, 4) |
| 4 | T4 (7, 4) |
| 5 | T5 (7, 2) |
| 6 | T6 (4, 1) |
| 7 | T7 (5, 2) |
| 8 | T8 (5, 4) |
| 9 | T9 (11, 4) |

FIG. 8(b)

|   | VERTEX COORDINATES |
|---|---|
| 1 | T1 (4, 7) |
| 2 | T3 (4, 4) |
| 3 | T8 (5, 4) |
| 4 | T4 (7, 4) |
| 5 | T7 (5, 2) |
| 6 | T5 (7, 2) |

FIG. 13

| INTERSECTION POINT | | $S_{51}$ | $S_{52}$ | $S_{53}$ | $S_{54}$ |
|---|---|---|---|---|---|
| INTERSECTION POINT COUNT | | 1 | 1 | 1 | 1 |
| DIRECTION VALUE | | -2 | -2 | 2 | 2 |
| HORIZONTAL FLAG | | 0 | 0 | 0 | 0 |
| SUM OF DIRECTION VALUES | | -2 | -4 | -2 | 0 |
| SUM OF HORIZONTAL FLAGS | | 0 | 0 | 0 | 0 |
| POST-OPERATION INTERSECTION POINT COUNT | | 1 | 1 | 1 | 1 |
| INSIDE REGION | EVEN-ODD RULE | ← | → | ← | → |
| | NON-ZERO WINDING NUMBER RULE | ← | | | → |

FIG. 9
| SUM OF HORIZONTAL FLAGS IMMEDIATELY BEFORE | SUM OF HORIZONTAL FLAGS OF CURRENT INTERSECTION POINT | INTERSECTING CONDITION |
|---|---|---|
| 0 | OTHER THAN 0 | LEFT END POINT OF HORIZONTAL PATH |
| OTHER THAN 0 | 0 | RIGHT END POINT OF HORIZONTAL PATH |
| OTHER THAN 0 | OTHER THAN 0 | INTERSECTING HORIZONTAL PATH |
| 0 | 0 | IRRELEVANT WITH HORIZONTAL PATH |
FIG. 10
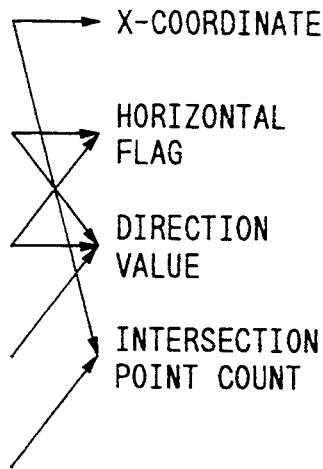
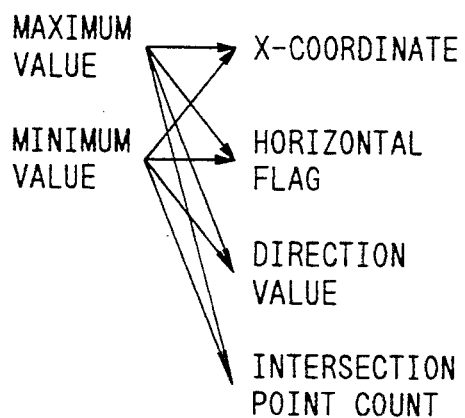

METHOD OF FINDING AND PAINTING A REGION OF A GRAPHICS FIGURE

This application is a continuation of application Ser. No. 07/740,140, filed Aug. 5, 1991, now abandoned.

BACKGROUND OF THE INVENTION

1. Field of the Invention

The invention relates to a method of painting graphics in computer graphics apparatuses, and more particularly to a method of painting graphics with improved efficiency.

2. Prior Art

An important aspect of painting graphics is how to identify the inside and outside regions of a graphic figure correctly; in other words, how accurately a painting region can be judged.

The rules for judging painting regions which have heretofore been employed include: a so-called even-odd rule and a non-zero winding number rule, and each of these rules has been used where appropriate as long as it serves the purpose.

The even-odd rule judges the inside and outside regions of a graphic figure based on whether or not the total of intersection counts (intersection point count) between a path, which is a segment forming the graphic figure, and a scanning line from the scanning start position is an even number or an odd number. And a region where the total of intersections changes from an odd number to an even number is treated as being a painting region (inside), while a region where the total of intersections changes from an even number to an odd number is treated as being a non-painting region (outside).

On the other hand, the non-zero winding number rule judges a region as follows. If a path intersecting a scanning line is a downward path, "1" is added to the intersection point counts, while if such a path is an upward path, "1" is subtracted from the intersection point counts with respect to that scanning line, and if the total of the intersection point counts from the scanning start position is "0", it is judged that the region is an outside region; otherwise, it is judged that the region is an inside region.

However, with such techniques, the case where the scanning line intersects a vertex indicating an extreme value or the case where the scanning line intersects a horizontal path cannot be well taken care of, thereby making it difficult to provide an accurate judgment of the painting region.

To overcome this problem, a technique for counting the intersection point count at an intersection point as "1" or "2" in accordance with the intersecting condition has been proposed in, e.g., Japanese Patent Unexamined Publication No. 192878/1987.

If, e.g., a scanning line intersects a vertex, this conventional art judges whether or not the vertex is an extreme point or a continuous point from the inclinations of the two paths which meet at that vertex. And if the vertex is an extreme point, "2" is given as its intersection point count, while if it is a continuous point, "1" is given.

Further, if a scanning line intersects a horizontal path, the intersection point count is set based on the inclinations of the two paths, each of which meets the start point and the end point of that horizontal path.

However, such conventional art requires calculations of the inclinations of the two paths meeting a vertex or the end points of a horizontal path, thereby making the operation complicated.

Further, lack of consideration for the case where a plurality of horizontal paths overlap on a single scanning line has made the painting region judgment incorrect.

SUMMARY OF THE INVENTION

The invention has been made to overcome the aforesaid problems. Accordingly, an object of the invention is to provide a method of painting graphics with improved efficiency.

To achieve the above object, the invention is directed to a method of painting graphics comprising the following means:

(1) In a method of painting a graphic in accordance with an even-odd rule, a painting region is judged by calculating data such as an intersection point count, a direction value, and a horizontal flag of respective intersection points; calculating a sum of direction values and a sum of horizontal flags of each intersection point based on the above data; calculating a post-operation intersection point count based on the intersection point count, the sum of direction values, and the sum of horizontal flags; and sequentially adding the post-operation intersection point counts from the scanning start point, so that the added value, either an even number or an odd number, serves as a basis for the judgment.

(2) In a method of painting a graphic in accordance with a non-zero winding number rule, a painting region is judged by calculating data such as a direction value and a horizontal flag of respective intersection points; and calculating a sum of direction values and a sum of horizontal flags based on these data, so that the sum of direction values and the sum of horizontal flags serve as a basis for the judgment.

Since the above methods allow the inside region or outside region of a graphic to be judged by referencing the sum of direction values and the sum of horizontal flags, even graphic figures having overlapping horizontal paths can be painted correctly.

BRIEF DESCRIPTION OF THE DRAWINGS

FIG. 4 is a diagram showing intersection point data with respect to FIG. 2;

FIGS. 8(a) and (b) are diagrams showing a vertex list and a sort list;

FIG. 9 is a diagram showing the physical concept of a sum of horizontal flags;

FIG. 10 is a diagram showing the relationship between a path list and intersection point data;

FIG. 13 is a diagram showing intersection point data with respect to FIG. 12.

DETAILED DESCRIPTION OF THE PREFERRED EMBODIMENTS

Figure 1:
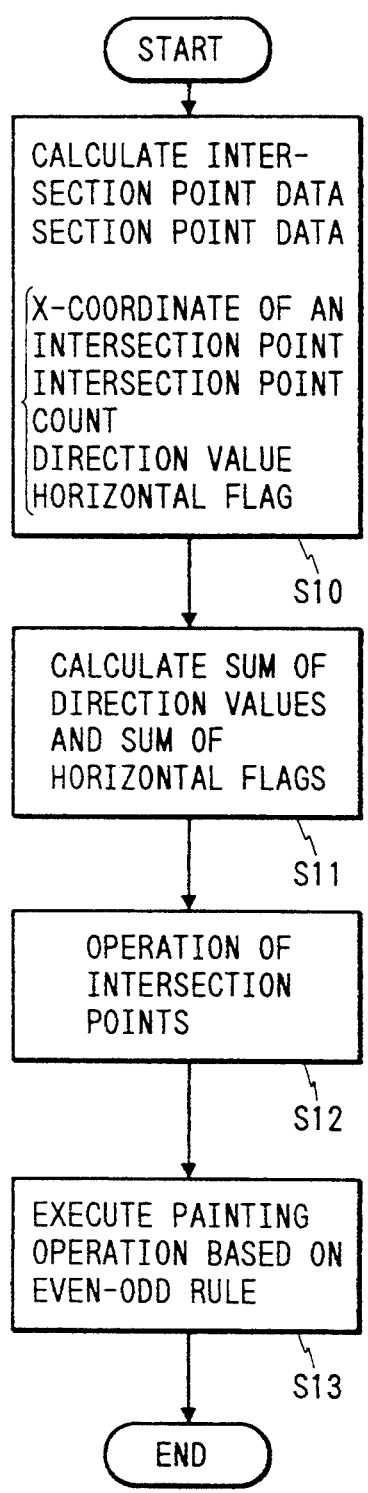
FIG. 1 is a flow chart illustrative of the basic concept of a first embodiment of the invention.
Figure 2:
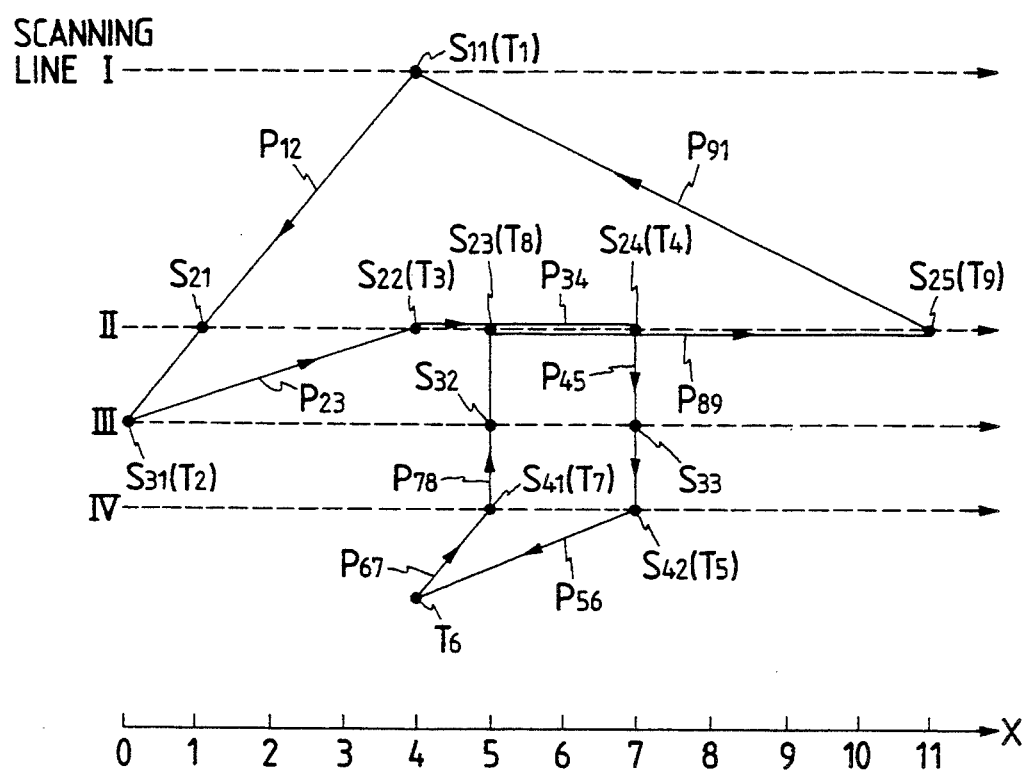
FIGS. 2 and 7 are diagrams showing graphic figures to be painted by the first embodiment of the invention.

The basic concept of a painting method in the case where a graphic figure shown in FIG. 2 is painted in accordance with an even-odd rule will be described with reference to FIG. 1.

In FIG. 2, reference characters $T_1$ to $T_9$ designate vertexes of the graphic figure; and $S_{11}$ to $S_{42}$, intersection points between paths $P_{12}$ to $P_{91}$ and scanning lines I to IV.

In Step S10, intersection point data between paths and scanning lines are calculated. The intersection point data consist of four parameters: (1) the X-coordinate of an intersection point; (2) an intersection point count; (3) a direction value; and (4) a horizontal flag; and the results of a calculation are as shown in FIG. 4.

(1) X-coordinate of an intersection point

By "the X-coordinate of an intersection point", it is intended to mean a coordinate of each of the intersection points $S_{11}$ to $S_{42}$ on the X-axis which is parallel with the scanning lines.

(b 2) Intersection point count

By "the intersection point count", it is intended to mean a sum of the following values on a single coordinate, assuming that an intersection count between a scanning line and a path is:

(a) "1" if the position of an intersection is a continuous point among connecting points between paths;
(b) "2" if the position of an intersection is a point other than a continuous point among connecting points between paths; and
(c) "1" if the position of an intersection is a point other than a connecting point.

Specifically, if a scanning line intersects a path at a point other than both end points of the path, then the intersection point count is "1", while if two paths intersect at a point other than their end points and if a scanning line intersects such intersection point, the intersection point count is "2". Also, if an intersection point is an end point at which two paths meet, such as extreme points (a maximum point and a minimum point), then the intersection point count is "2". However, as will be exemplified later, if a point is both an end point and at the same time a connecting point, the intersection point count is "1".

For example, at the intersection point $S_{21}$, the scanning line II intersects only the downward path $P_{12}$. Thus, the intersection point count for $S_{21}$ is "1". At the intersection point $S_{22}$, the scanning line II intersects both an end point of the upward path $P_{23}$ and the start point of the horizontal path $P_{34}$. Thus, the intersection point count for $S_{22}$ is "2". At the intersection point $S_{11}$, where the downward path $P_{12}$ meets the upward path $P_{91}$ as a maximum point, the intersection point count for $S_{11}$ is "2".

Although the intersection point $S_{42}$ is the connecting point where the downward path $P_{45}$ meets the downward path $P_{56}$, the intersection point $S_{42}$ (which is the vertex $T_5$) is judged to be a continuous point, because it has such a relationship as $T_4 < T_5 < T_6$ with respect to the Y-coordinates of its preceding and succeeding vertexes $T_4$, $T_6$. Thus, the intersection point count for $S_{42}$ is "1".

Thus, a continuous point can be defined as being a vertex having such a relationship as $Y_{n-1} < Y_n < Y_{n+1}$ or $Y_{n-1} > Y_n > Y_{n+1}$, where $Y_n$ is the Y-coordinate of an intersection point at which two paths meet; and $Y_{n-1}$, $Y_{n+1}$ are the Y-coordinates of respective end points of the two paths which are opposite to the intersection point $Y_n$. At such a continuous point, a path including the continuous point as the upper end point or a path including the continuous point as the lower end point is not added to the intersection point count.

(3) Direction value

By "the direction value", it is intended to mean a variable set for a path when each path is divided into a plurality of paths by the distance between scanning lines. The direction value is defined as follows.

It is assumed that the path direction is:
"1" for an upward path;
"−1" for a downward path; and
"0" for a horizontal path.

If the path includes the upper or lower end, then $$\text{its direction value} = \text{path direction} \times 1.$$

If the path is between the paths including the upper end and the lower end, then $$\text{its direction value} = \text{path direction} \times 2.$$

In other words, the direction values become as follows in accordance with the position of an intersection point.

(a) If the position of an intersection point is an end point of an upward path, its direction value is "1";
(b) If the position of an intersection point is an end point of a downward path, its direction value is "−1";
(c) If the position of an intersection point is a point other than an end point of an upward path, its direction value is "2" and
(d) If the position of an intersection point is a point other than an end point of a downward path, its direction value is "−2".

And the sum of these values on a single coordinate becomes the direction value of the intersection point.

For example, at the intersection point $S_{11}$, the scanning line I intersects the starting point of the downward path $P_{12}$ and the end point of the upward path $P_{91}$. The direction value for $S_{11}$ is calculated as follows.

$$\begin{aligned}\text{Direction value} &= \text{path direction } [-1] \times 1 + \\ &\quad \text{path direction } [1] \times 1 \\ &= 0\end{aligned}$$

At the intersection point $S_{21}$, the scanning line II intersects the downward path $P_{12}$ between its end points. The direction value for $S_{21}$ is calculated as follows.

$$\begin{aligned}\text{Direction value} &= \text{path direction } [-1] \times 2 \\ &= -2\end{aligned}$$

At the intersection point $S_{22}$, the scanning line II intersects the end point of the upward path $P_{23}$ and the start point of the horizontal path $P_{34}$. However, since the path direction of the horizontal path $P_{34}$ is "0", the direction value for $S_{22}$ considers only the upward path $P_{23}$ and is thus calculated as follows.

Direction value = path direction [1] × 1
= 1

(4) Horizontal flag
The horizontal flag is defined as follows.
For a path other than a horizontal path, it is "0". For a horizontal path, the following rule is applied.
A horizontal path which is an mth path when counted from the left end on a scanning line has the following values.
Its left end point: "m"
Its right end point: "−m" (where m is an integer)
Specifically, when there are such two horizontal paths on a single scanning line as the horizontal paths $P_{34}$ and $P_{89}$, the left end point $S_{22}$ of the first horizontal path $P_{34}$ from the left end has a flag value of "1", and its right end point $S_{24}$ has a flag value of "−1"; while the left end point $S_{23}$ of the second horizontal path $P_{89}$ has a flag value of "2", and its right end point $S_{25}$ has a flag value of "−2".

Then, in Step S11, (5) the sum of direction values and (6) the sum of horizontal flags are calculated for each scanning line based on the intersection point data.

A method of calculating the sum of direction values and the sum of horizontal flags as well as their physical concepts will be described below. The results of calculations are as shown in FIG. 4.

(5) Sum of direction values
The sum of direction values is obtained by adding the direction values of respective intersection points by the scanning line in the ascending order of X-coordinates.

For example, since the intersection point $S_{21}$ is the smallest intersection point on the X-axis with respect to the scanning line II, its direction value "−2" is given as the sum of direction values, while at the intersection point $S_{22}$, the direction value "1" of the intersection point $S_{22}$ is added to the sum of direction values of the intersection point $S_{21}$, and thus "−1" is given as the sum of direction values for $S_{22}$.

Similarly, at the intersection point $S_{23}$, the direction value "1" of the intersection point $S_{23}$ is added to the sum of direction values of the intersection point $S_{22}$, and thus "0" is given as the sum of direction values for $S_{23}$.

The sum of direction values thus calculated indicates in physical terms that an intersection point whose sum of direction values varies from "0" to "non-0" is a point of change from the outside to the inside of a graphic figure and that an intersection point whose sum of direction values varies from "non-0" to "0" is a point of change from the inside to the outside of a graphic figure.

(6) Sum of horizontal flags
The sum of horizontal flags can be calculated by adding the horizontal flags of respective intersection points by the scanning line in the ascending order of X-coordinates.

For example, since intersection points $S_{21}$ is the smallest intersection point on the X-axis with respect to the scanning line II, its horizontal flag "0" is given as the sum of horizontal flags, while at the intersection point $S_{22}$, the horizontal flag of the intersection point $S_{22}$ is added to the sum of horizontal flags of the intersection point $S_{21}$, and thus "1" is given as the sum of horizontal flags for $S_{22}$.

Similarly, at the intersection point $S_{23}$, the horizontal flag of the intersection point $S_{23}$ is added to the sum of horizontal flags of the intersection point $S_{22}$, and thus "3" is given as the sum of horizontal flags for $S_{23}$.

The sum of horizontal flags thus calculated has a physical meaning shown in FIG. 9.

For example, with respect to the intersection point $S_{22}$, since the sum of horizontal flags up to a point immediately before a current intersection point is "0" and the sum of horizontal flags of the current point is "1", the intersection point $S_{22}$ is judged to be the left end point of a horizontal path.

Also, with respect to the intersection point $S_{25}$, since the sum of horizontal flags of a point immediately before a current intersection point is "2" and the sum of horizontal flags of the current point is "0", the intersection point $S_{25}$ is judged to be the right end point of a horizontal path.

Likewise, with respect to the intersection point $S_{33}$, since the sum of horizontal flags of a point immediately before a current intersection point is "0" and the sum of horizontal flags of the current point is "0", the intersection point $S_{33}$ is judged to be as intersecting no horizontal path.

Then, in Step S12, the post-operation intersection point count is calculated.

(7) Post-operation intersection point count
By "the post-operation intersection point count", it is intended to mean an operation by which the previously obtained intersection point count is corrected by introducing the sum of direction values and the sum of horizontal flags so as to allow a painting region to be identified based on the even or odd value of the intersection point count even if a plurality of horizontal paths overlap on the same scanning line. Such operation is performed under the following conditions.

Case 1:
If an intersection point is irrelevant with a horizontal path, then the previously obtained intersection point count is registered as a post-operation intersection point count with no correction.

Case 2:
If an intersection point includes the left end point of a horizontal path, and if the sum of direction values up to a point immediately before a current intersection point is "0", then the intersection point count is corrected to "1". If the sum of direction values up to a point immediately before a current intersection point is other than "0", then the intersection point count is corrected to "2".

Case 3:
If an intersection point intersects a horizontal path, then the intersection point count is corrected to "2".

Case 4:
If an intersection point includes the right end point of a horizontal path, and if the sum of direction values up to a current intersection point is "0", then the intersection point count is corrected to "1". If the sum of direction values up to the current intersection point is other than "0", the intersection point count is corrected to "2".

In accordance with the above rule, the method of calculating the post-operation intersection point count at each intersection point will be specifically described.

For example, referring to the scanning line II, since the intersection point $S_{21}$ is the first intersection point with respect to the scanning line II, the sum of horizontal flags up to a point immediately before the current intersection point is "0" and the sum of horizontal flags of the current intersection point is "0" as shown in FIG.

4. Therefore, it is understood from FIG. 9 that the intersection point $S_{21}$ is irrelevant with a horizontal path. Hence, the operation of the intersection point $S_{21}$ corresponds to the case 1 and thus its post-operation intersection point count remains as being "1".

Further, since the sum of horizontal flags up to a point immediately before the intersection point $S_{23}$ is "1", the sum of horizontal flags of the current intersection point is "3". Therefore, it is understood that the intersection point $S_{23}$ is a point intersecting a horizontal path. Hence, the operation of the intersection point $S_{23}$ corresponds to the case 3 and thus its post-operation intersection point count becomes "2".

Further, since the sum of horizontal flags up to a point immediately before the intersection point $S_{25}$ is "2" and the sum of horizontal flags of the current intersection point is "0", it is understood that the intersection point $S_{25}$ is the right end point of a horizontal path. Therefore, the operation of the intersection point $S_{25}$ corresponds to the case 4, and since the sum of direction values up to the current intersection point is "0", its post-operation intersection point count is corrected to "1".

In Step S13, a painting operation is performed based on the post-operation intersection point count.

Figure 3:
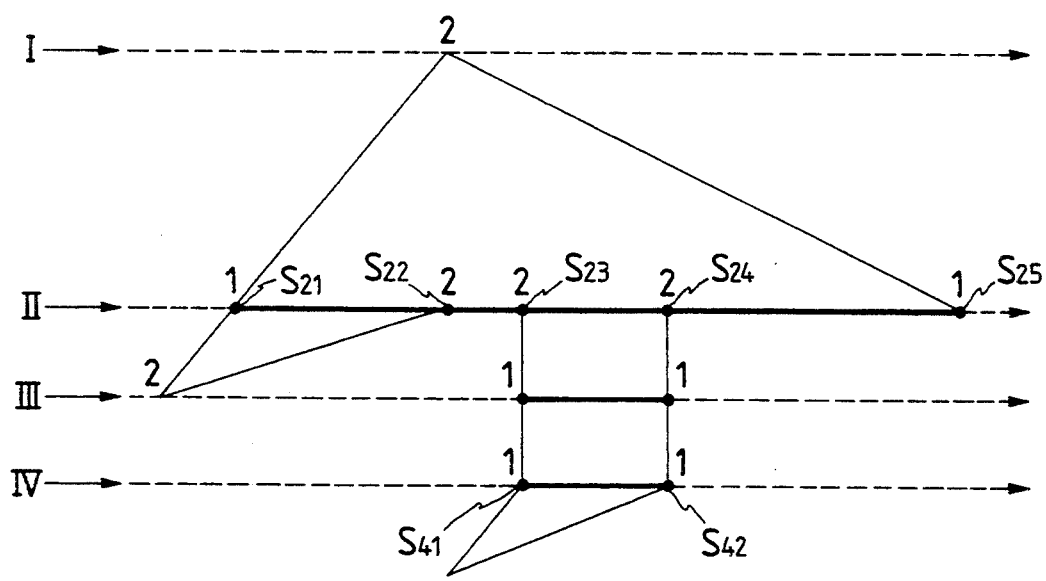
FIG. 3 is a diagram showing the result of painting.

FIG. 3 shows the result of the painting based on the post-operation intersection point count. Here, to facilitate the understanding of the drawing, only portions relative to the scanning lines I to IV are shown to be painted.

For example, with respect to the scanning line II, since the intersection point count from the scanning start point to the intersection point $S_{21}$ is "0" (an even number), no painting is performed, while since the intersection point count of the intersection point $S_{21}$ is "1" (an odd number), painting is started.

Although at each of the intersection points $S_{22}$, $S_{23}$, $S_{24}$, the intersection point count "2" is added, the total of the intersection point counts becomes an odd number, thereby causing the painting to be continued, while at the intersection point $S_{25}$, the intersection point count "1" is added to make the total to be an even number, thereby causing the painting to be ended.

Similarly, with respect to the scanning line IV, since the intersection point count from the scanning start point to the intersection point $S_{41}$ is "0" (an even number), no painting is performed, while since the intersection point count of the intersection point $S_{41}$ is "1" (an odd number), painting is started.

Figure 5:
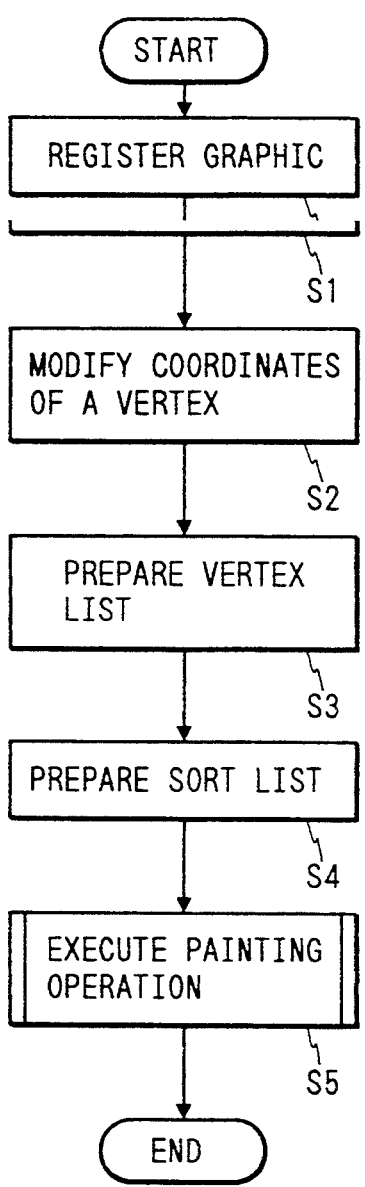
FIGS. 5 and 6 are flow charts of the first embodiment of the invention.
Figure 7:
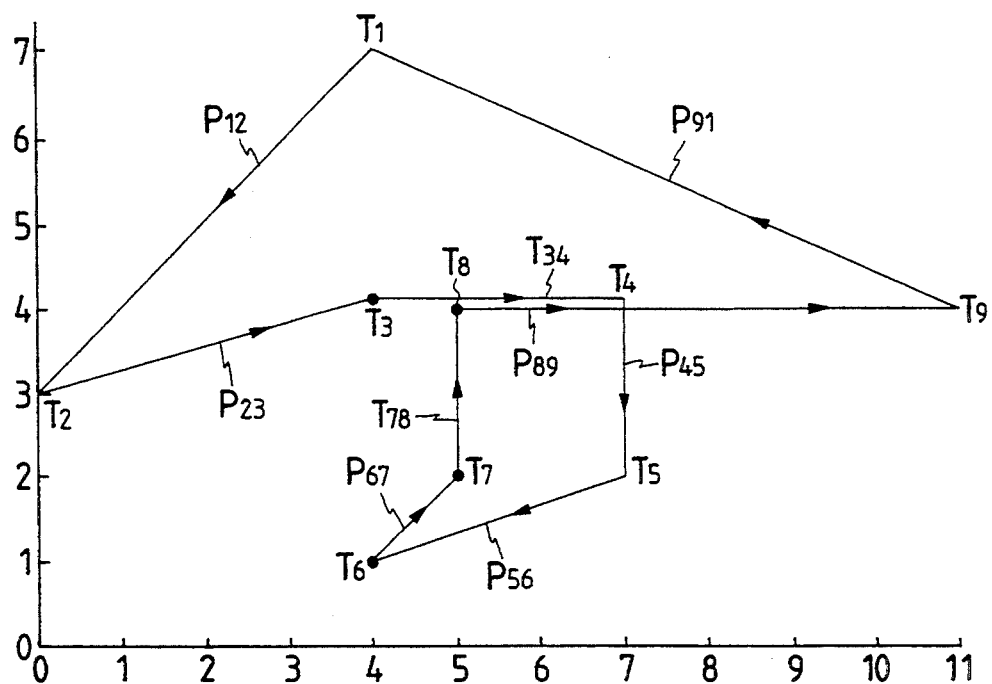

An embodiment of a method of painting a graphic figure shown in FIG. 7 will be described with reference to a flow chart shown in FIG. 5.

In Step S1, the indicated graphic figure is registered first.

The registration is performed by connecting all the vertex coordinates of the graphic figure in the order of drawing it with a single stroke if the graphic figure is a polygon. If the graphic figure is a circle or an ellipse, the coordinates of its center, radius, opening angle, and the like will be inputted.

If the graphic figure has a curved portion in part, the curved portion is deemed as part of an ellipse and the coordinates of its centers, radii, opening angles, and the like will be similarly inputted, or such graphic figure is registered by utilizing a so-called Bezier curve for creating curved paths.

In the case of this embodiment, the vertex coordinates $T_1$ (4, 7) to $T_9$ (11, 4) are sequentially registered, and it is by the order of such registration that the direction of a path connecting the vertexes is defined.

In Step S2, a circular graphic figure or a graphic figure having curved lines is subjected to linear approximation so that it can be modified into a polygon, and all the vertexes of such approximated polygon are registered as the vertex coordinates.

In Step S3, a vertex list such as shown in FIG. 8(a) is prepared for the thus registered vertex coordinates.

In Step S4, a sort list is prepared based on the vertex list.

By "the sort list", it is intended to mean a list in which all the registered vertex coordinates are detected in the descending order of Y-coordinates and only coordinates satisfying one of the following three conditions are sequentially registered.

Condition 1: The end point of an upward line;
Condition 2: The start point of a downward line;
Condition 3: The start point of a horizontal line.

FIG. 8(b) shows a sort list of this embodiment. For example, since the vertex coordinates $T_1$ is both the start point of a downward line and the end point of an upward line, and the vertex coordinates $T_3$ is the start point of a horizontal line, the above registration conditions are satisfied. Thus, they are registered in the sort list.

On the other hand, the vertex coordinates $T_2$, $T_6$, $T_9$ satisfy none of the above conditions, and thus they are not registered in the sort list.

When the sort list has been prepared as described above, a painting operation is executed in Step S5.

Figure 6:
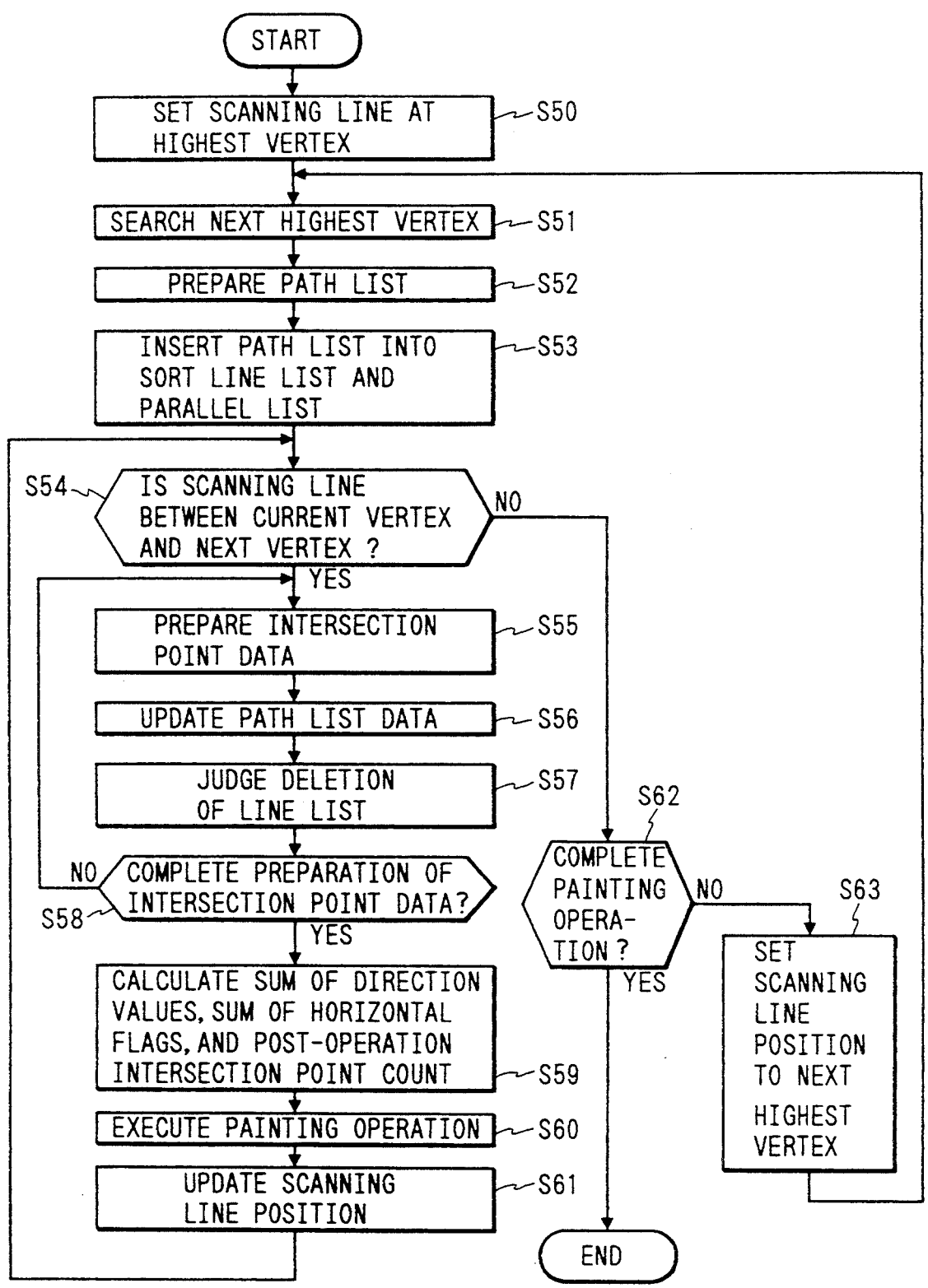

The painting operation of the invention will be described in detail with reference to a flow chart shown in FIG. 6.

In Step S50, a scanning line is set to the Y-coordinate of the highest vertex in the sort list; i.e., the Y-coordinate of the vertex coordinates $T_1$, which is "7".

In Step S51, the next highest vertex in the sort list is searched. The vertex coordinates $T_3$ is registered as the next highest vertex in this embodiment.

In Step S52, a path list is prepared for all the paths having a current vertex as an end point. If the current vertex is $T_1$, a path list for the path $P_{12}$ extending from the vertexes $T_1$ to $T_2$, and a path list for the path $P_{91}$ extending from the vertexes $T_9$ to $T_1$ are prepared.

For such a path list, if a path is a horizontal path, the minimum (the left end point) and the maximum (the right end point) are registered, while if a path is other than a horizontal path, such data as the coordinates of the intersection point between the path and the scanning line, the coordinates of the start point of the path, the coordinates of the end point of the path, a control flag (CF) indicating the path direction, and a path condition (PC) indicating an intersecting condition between the path and the scanning line will be registered.

Among these data, a path direction is registered in the CF data. The path direction is judged by comparing the Y-coordinates of both end points of a path. For example, if the Y-coordinate of the start point is greater than the Y-coordinate of the end point, it is judged that the path is a downward path, and "−1" is registered, while if it is judged that the path is an upward path, then "1" is registered.

The PC is defined as follows in accordance with the intersecting condition.

If the intersection point is a continuous point:

PC=3

If the intersection point is a vertex other than a continuous point:

PC=1

If the intersection point is other than the above:

PC=2

Such intersecting conditions are judged by comparing the Y-coordinate of an intersection point with the Y-coordinates of the end points of paths which meet at such intersection point. For example, if the Y-coordinate of an intersection point is greater than the Y-coordinates of the end points of its preceding and succeeding paths, such intersection point is judged to be an extreme point (the maximum point), while if the Y-coordinate of an intersection point is between the Y coordinates of the end points of its preceding and succeeding paths, such intersection point is judged to be a continuous point.

The PC thus obtained is utilized in the operation of calculating the intersection point count in Step S10 which has been described with reference to FIG. 1.

In Step S53, the path lists for horizontal and standard paths thus prepared are registered to a parallel list and a sort line list, respectively.

When the preparation of the path lists, each having a vertex intersecting a scanning line as an end point, has been completed, it is judged in Step S54 whether or not a current scanning line is between a current vertex and a next vertex. If it is judged affirmatively, the operation in Step S55 will be performed. In Step S55, the intersection point data are prepared based on the path lists registered in the sort line list and the parallel list.

For example, if a current vertex is $T_1$, it is judged that a scanning line is between the vertex $T_1$ and the next vertex $T_3$, and in Step S55, the intersection point data (see the column for the scanning line I in FIG. 4) with respect to the intersection points between the respective paths and scanning lines are prepared based on the path lists.

The relationship between the path lists and the intersection point data is shown in FIG. 10.

For a path other than a horizontal path, the X-coordinate of the intersection point data is obtained based on the coordinates of an intersection point in the path list, while the direction value of the intersection point data is obtained based on the coordinates of the start point, the coordinates of the end point, and the CF in the path list. On the other hand, the intersection point data for a horizontal path is obtained based on the maximum and minimum values in the path list registered in the parallel list.

In Step S56, the coordinates of each intersection point between the scanning line next to a current scanning line and respective paths are calculated, and the coordinates of the intersection point in each path list registered in the sort line list are updated by the calculated coordinates of the intersection point.

In Step S57, it is judged whether or not an intersection point between a current scanning line and a path is a lower end point, and if it is judged that the intersection point is a lower end point, the path list of that path is deleted from the sort line list or the parallel list.

In Step S58, it is judged whether or not the preparation of the intersection point data for all the intersection points with respect to a concerned scanning line has been completed.

If the preparation of the intersection point data has not yet been completed, Steps S55, S56, S57 are repeated, and if completed, the sum of direction values, the sum of horizontal flags, and the post-operation intersection point count are calculated in Step S59 (see FIG. 4).

In Step S60, the painting region is determined based on the post-operation intersection point count, and the painting operation is executed. In Step S61, the scanning position is updated and Step S54 will be repeated thereafter.

As described above, if a current vertex is the vertex $T_1$, the vertex $T_1$ is painted by Step S60, and since the scanning position is forwarded to a next scanning position in Step S61, the Steps S54 to S61 are performed at a scanning position which is one scanning line width below the scanning line I.

By repeating the above operations, the region between the paths $P_{12}$ and $P_{91}$ is painted. Then, when the scanning position is judged as passing on the next vertex $T_3$; i.e., if it is judged in Step S54 that the current scanning line is not between the current vertex and the next vertex, then it is judged in Step 62 whether or not the painting of a concerned graphic figure has been completed. If the painting has been completed, the current operation is terminated, while if not, the scanning position is set to a next vertex in Step S63 and then each operation will be repeated from Step S52.

Further, if the above operations are further continued, then the operation is terminated upon judgment in Step S62 which is affirmative.

Figure 11:
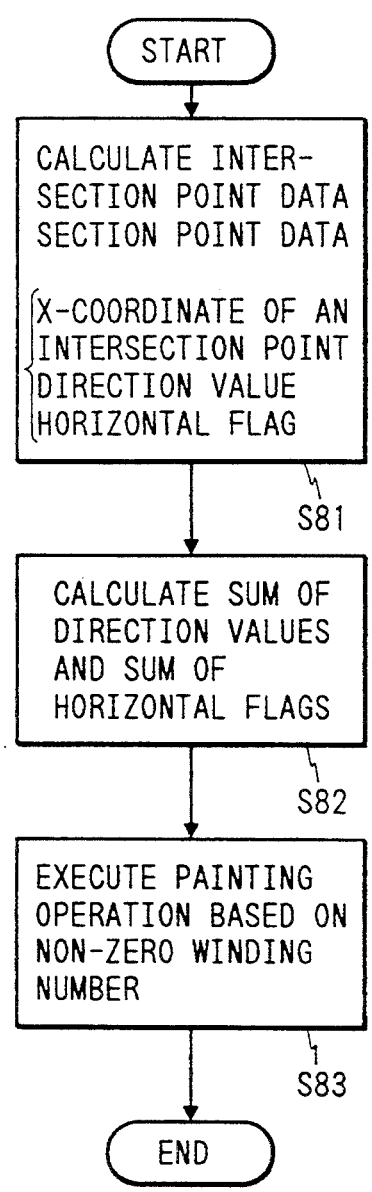
FIG. 11 is a flow chart illustrative of the basic concept of a second embodiment of the invention.
Figure 12:
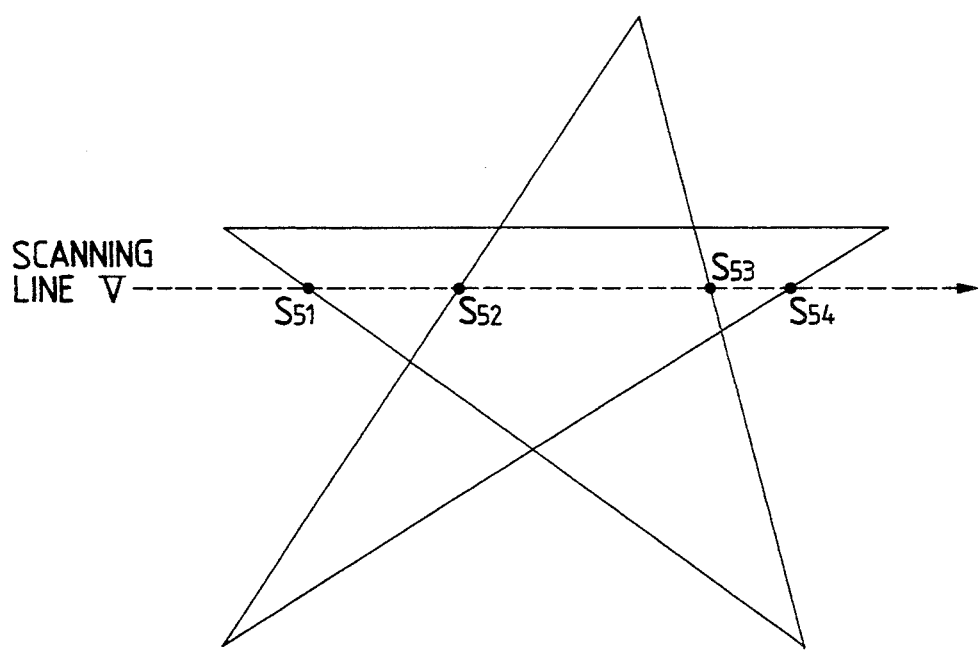
FIG. 12 is a diagram showing a graphic figure to be painted by the second embodiment of the invention.

The basic concept of a method of painting a graphic figure shown in FIG. 12 based on the non-zero winding number rule will now be described with reference to a flow chart shown in FIG. 11.

In Step S81, for example, with respect to the intersection points $S_{51}$, $S_{52}$, $S_{53}$, $S_{54}$ which intersect the scanning line V, the intersection point data are calculated in a manner similar to what has been described above. However, since the non-zero winding number rule does not include such parameter as the intersection point count, the three parameters such as the X-coordinate, the direction value, and the horizontal flags of an intersection point are calculated.

In Step S82, although the sum of direction values and the sum of horizontal flags are calculated in a manner similar to the above, the post-operation intersection point count, not being necessary either, is not calculated.

FIG. 13 shows the result of the calculations based on the non-zero winding number rule. In FIG. 13, the intersection point count and the post-operation intersection point count are additionally indicated so that the result of judgment by the non-zero winding number rule can be well distinguished from that by the even-odd rule.

In Step S83, the painting operation is performed based on the calculation results. It is judged in this embodiment that the point at which the sum of direction values changes from "0" to "non-0" is the left end point of the inside region, while it is judged that the point at which the sum of direction values changes from "non-0" to "0" and the sum of horizontal flags is "0" is the right end point of the inside region. And any positions other than the above are judged to be the outside region.

Hence, with respect to the scanning line V, the region from the intersection points $S_{51}$ to $S_{54}$ are judged to fall within the inside region.

As shown in FIG. 13, in the even-odd rule, the region from the intersection points $S_{51}$ to $S_{52}$ and the region from the intersection points $S_{53}$ to $S_{54}$ are judged to be the inside region, while the region from the intersection points $S_{52}$ to $S_{53}$ is judged to be the outside region.

As is clear from the foregoing description, according to the preferred embodiments of the invention, the method of painting operation in accordance with the even-odd rule and the non-zero winding number rule judges the inside region while referencing such factors as the sum of direction values and the sum of horizontal flags. Therefore, not only graphic figures whose vertexes are extreme points and continuous points, but also graphic figures having overlapping horizontal paths can be painted correctly.

What is claimed is:

1. A method of finding and painting a region of a graphic figure to be displayed by a graphics apparatus, the graphic figure having multiple paths defining one or more regions, the method comprising the steps, performed by a processor, of:

extracting a plurality of colinear points from a graphic signal representing the graphic figure to produce signals representing a set of extracted points;

processing each extracted point signal by
determining whether the point is a connecting point,
determining whether the point is a continuous point,
determining a first value in accordance with whether the point is a continuous point and whether the point is a connecting point,
determining whether the point is on an upward path,
determining whether the point is an end of a path,
determining a second value in accordance with whether the point is an on an upward path, whether the point is on a downward path, and whether the point is an end of a path,
determining whether the point intersects a horizontal path,
determining whether the point is a left end of a horizontal path,
determining whether the point is a right end of a horizontal path,
determining a third value in accordance with whether the point intersects a horizontal path, whether the point is a left end of a horizontal path, the point is a right end of a horizontal path, and in accordance with a sum of determined second values for a plurality of other processed points; and generating a plurality of sums of third values;

finding a region to be painted by generating a signal responsive to said generated plurality of sums and indicating whether each of the plurality of sums is an odd number or an even number; and painting the found region of the graphic figure by scanning on the display of the computer graphics apparatus responsive to said indicating signal.

2. The method according to claim 1, wherein the step of determining the first value includes the substep of selecting a first constant from a first set of constants if the point is a continuous point, a second constant from the first set if the point is a point other than a continuous point, and the first constant from the first set if the point is a point other than a connecting point, and wherein the step of determining the second value includes the substep of selecting a first constant from a second set of constants if the point is an end of an upward path, a second constant from the second set if the point is an end of a downward path, a third constant from the second set if the point is a point other than an end of an upward path, and a fourth constant from the second set if the point is a point other than an end of a downward path, and wherein the step of determining the third value includes the substep of selecting the first value if the point is irrelevant with a horizontal path, a first constant from a third set of constants if the point is a left end of a horizontal path and if a sum of second values up to a point immediately before the point is 0, and the second constant from the fourth set if the sum of second values up to the point immediately before the point is other than 0, the second constant from the fourth set if the point intersects a horizontal path, and the first constant from the fourth set if the point is a right end of a horizontal path and if the sum of second values up to the current point is 0, and the second constant from the fourth set if the sum of second values up to the current point is other than 0.

3. The method according to claim 2, wherein the step of determining the third value includes the substeps of determining another value to be
0 for a path other than a horizontal path, M times a constant from a fourth set of constants for an end of a horizontal path if the horizontal path is an Mth path when counted from a first point and the end is on the scanning line start point side, and $-M$ times the constant from the fourth set of constants for an end of a horizontal path if the horizontal path is an Mth path when counted from the first point and the end is on the side opposite to the line start point side;

summing fourth values from the first point to a point immediately preceding a currently processed point; and summing fourth values from the first point to the currently processed point.

4. The method according to claim 1, wherein the step of determining the third value includes the substeps of determining another value to be
0 for a path other than a horizontal path, M times a constant from a fourth set of constants for an end of a horizontal path if the horizontal path is an Mth path when counted from a first point and the end is on the scanning line start point side, and $-M$ times the constant from the fourth set of constants for an end of a horizontal path if the horizontal path is an Mth path when counted from the first point and the end is on the side opposite to the line start point side;

summing fourth values from the first point to a point immediately preceding a currently processed point; and summing fourth values from the first point to the currently processed point.

5. The method according to claim 1, wherein the step of determining the first value includes the substep of selecting a first constant from a first set of constants if the point is a continuous point, twice the first constant from the first set if the point is a point other than a continuous point, and the first constant from the first set if the point is a point other than a connecting point, and wherein the step of determining a second value includes the substep of selecting a first constant from a second set of constants if the point is an end of an upward path, minus the first constant from the second set if the point is an end of a downward path, twice the first constant from the second set if the point is a point other than an end of an upward path, and minus twice the first constant from the second set if the point is a point other than an end of a downward path, and wherein the step of determining a third value includes the substep of selecting the first value if the point is irrelevant with a horizontal path, a first constant from a third set of constants if the point is a left end of a horizontal path and if a sum of second values up to a point immediately before the point is 0, and twice the first constant from the fourth set if the sum of second values up to the point immediately before the point is other than 0, twice the first constant from the fourth set if the point intersects a horizontal path, and the first constant from the fourth set if the point is a right end of a horizontal path and if the sum of second values up to the current point is 0, and twice the first constant from the fourth set if the sum of second values up to the current point is other than 0.

6. The method according to claim 5, wherein the step of determining the third value includes the substeps of determining another value to be 0 for a path other than a horizontal path, M times a constant from a fourth set of constants for an end of a horizontal path if the horizontal path is an Mth path when counted from a first point and the end is on the line start point side, and $-M$ times the constant from the third set for an end of a horizontal path if the horizontal path is an Mth path when counted from the first point and the end is on the side opposite to the scanning line start point side, summing fourth values from the first point to a point immediately preceding the currently processed point; and summing fourth values from the first point to the currently processed point.

7. A method of painting a graphic figure to be displayed on a display of a graphics apparatus, the graphic figure having multiple paths defining one or more regions, the method comprising the steps, performed by a processor, of:

extracting a plurality of colinear points from a graphic signal representing the graphic figure to produce signals representing a set of extracted points;

processing each extracted point signal by determining whether the point is a connecting point, determining whether the point is a continuous point, determining a first value in accordance with whether the point is a continuous point and whether the point is a connecting point, determining whether the point is on a horizontal path, determining whether the point is an end of a horizontal path, determining a second value in accordance with whether the point is on a horizontal path, and whether the point is an end of a horizontal path;

generating a first plurality of sums of first values;

generating a second plurality of sums of second values; and finding a region to be painted by generating a signal responsive to said first and second generated pluralities of sums and indicating when a region is between a point at which the sum of first values changes from 0 to non-0 and a point at which both the sum of the first values changes from non-0 to 0 and the sum of second values is 0; and painting the found region of the graphic figure by scanning on the display of the computer graphics apparatus responsive to said indicating signal.

8. The method of claim 7, wherein the step of determining the first value includes the substep of selecting a first constant if the point is an end point of an upward path, a second constant if the point is an end point of a downward path, a third constant if the point is a point other than an end point of an upward path, and a fourth constant if the point is a point other than an end point of a downward path, and wherein the substep of determining the second value includes the substep of selecting 0 for a path other than a horizontal path, M times a fifth constant for an end point of a horizontal path if the horizontal path is an Mth path when counted from a first point and the end point is on the scanning line start point side, and $-M$ times the fifth constant for an end point of a horizontal path if the horizontal path is an Mth path when counted from the first point and the end point is on the side opposite to the scanning line start point side.

9. The method of claim 7, wherein the step of determining the first value includes the substep of selecting a first constant if the point is an end of an upward path, minus the first constant if the point is an end of a downward path, twice the first constant if the point is a point other than an end of an upward path, and minus twice the first constant if the point is a point other than an end of a downward path, and wherein the step of determining the second valve includes the substep of selecting 0 for a path other than a horizontal path, M times a second constant for an end of a horizontal path if the horizontal path is an Mth path when counted from a first point and the end is on the scanning line start point side, and $-M$ times a second constant for an end of a horizontal path if the horizontal path is an Mth path when counted from the first point and the end is on the side opposite to the scanning line start point side.

* * * * *

UNITED STATES PATENT AND TRADEMARK OFFICE
CERTIFICATE OF CORRECTION

PATENT NO. : 5,450,534
DATED : September 12, 1995
INVENTOR(S) : Akira Ichikawa

It is certified that error appears in the above-indentified patent and that said Letters Patent is hereby corrected as shown below:

Claim 1, Column 11, Line 42, delete "an" (First occurrence).

Signed and Sealed this

Fifteenth Day of October, 1996

Attest:

BRUCE LEHMAN

Attesting Officer        Commissioner of Patents and Trademarks